United States Patent Office 3,625,705
Patented Dec. 7, 1971

3,625,705
THERMOGRAVITATIONAL COFFEE EXTRACT CONCENTRATION
Charles W. Ehrgott, Rumson, N.J., assignor to General Foods Corporation, White Plains, N.Y.
No Drawing. Filed Aug. 7, 1969, Ser. No. 848,347
Int. Cl. A23f 1/08
U.S. Cl. 99—71                                     4 Claims

ABSTRACT OF THE DISCLOSURE

Coffee extract is passed through a narrow channel and a temperature differential is set up across the channel. The thermal difference thus imposed across the extract causes diffusional concentration of the extract, and the more concentrated extract separates out at the bottom of the channel, while dilute extract rises to the top of the channel.

BACKGROUND OF THE INVENTION

This invention concerns a unique method of concentrating coffee extract. Specifically, it relates to the concentration of extract by a thermal gravitational technique.

For various reasons the extract obtained in commercial coffee percolation systems generally has a solids concentration of from 15 to 30%. With the advent of freeze drying many processes have been developed in which it is advantageous to concentrate the extract to a higher solids content than that obtained from the percolators prior to freezing and freeze drying. Extensive work has been reported in the literature on evaporative concentration and freeze concentration as means of concentrating coffee extract. Evaporative techniques have proven unsatisfactory in many instances as they have caused a downgrading of the extract quality. While freeze concentration techniques are generaly recognized as a means of preserving extract quality, many of the processes developed require expensive and cumbersome equipment and are complicated by the need for additional equipment to recover solids entrained in the ice.

SUMMARY OF THE INVENTION

It has now been discovered that coffee extract can be concentrated by feeding the extract through a narrow vertical channel and imposing a temperature differential across the channel. The extract is fed into the center of the channel and is drawn off at the top and bottom of this channel. The extract drawn off at the top is more dilute then the feed extract and the extract drawn off at the bottom is more concentrated then the feed extract.

In addition to being used strictly as a means of concentrating extract the method of this invention can be used to separate out and obtain a specific desirable fraction of the extract. Thus the process of this invention offers advantages over other concentration techniques in that the extract can be separated into more than one fraction, the different fractions potentially having different flavor characteristics.

DESCRIPTION OF THE PREFERRED EMBODIMENT

Extract obtained from commercial percolators is concentrated by passing it into a narrow channel and imposing a temperature differential across the channel. The concentration effect is achieved by thermal diffusion set up due to the imposed temperature gradient and by the gravitational separation of the more dilute and more concentrate phases.

In order to permit a high thermal gradient to be induced across the extract, the width of the channel should be limited to about 0.1 inch maximum. A preferred range for the channel width is 0.01 to 0.05 inch.

The channel is formed by solid retaining walls preferably constructed of material with a high thermal conductivity which is compatable with coffee extract. The temperature gradient is induced by passing controlled temperature fluids past the outer walls forming the channel. There should be at least a 50° F. temperature differential between the control temperature fluids in order to set up a temperature gradient across the extract which will achieve reasonable diffusion rates. Preferably a temperature gradient of at least 75° F. will be maintained. The temperature limits for the control temperature fluids are determined by the physical characteristics of coffee extract. Thus, the colder fluid generally should not be at a temperature below 32° F. in order to avoid freezing water out of the extract. Naturally, dependent upon the extract concentration, the actual ice point will be somewhat lower than 32° F. and the temperature of the cooling fluid can be somewhat cooler. The hot fluid should not be raised to a temperature at which flavor deterioration of the extract will occur. The upper temperature of the fluid should not exceed 200° F. and preferably will be less than 180° F. The control temperature fluids can be any fluid compatable with a conductive cooling system at the specified temperatures. Water is perfectly satisfactory for use as both the warm and cold fluids.

The process of this invention may be carried out in as many stages as are necessary to obtain desired concentrations of dilute and concentrated extracts. The channels can be formed via a series of spaced vertical plates wherein extract would be fed through a channel formed by two of the plates. A cooling fluid would be passed through the channel on one side of the extract and a warm fluid would be passed through the channel on the other side of the extract. Thus, a commercial set up can be visualized as a row of spaced plates wherein every other space between plates forms a channel for extract flow and the channels not being utilized for extract would alternately have cold and hot fluids passing through them. The extract is normally fed into the center of a vertical channel and the concentrated and dilute extract streams drawn off either continually or intermittently from the top and bottom of the channels.

The height of a channel may be sufficient to permit the entire concentration process to be performed within one channel. Alternatively, it may be more desirable to limit the height and use concentrate and dilute streams drawn off from one channel as feed streams for additional channels. In such an arrangement the different channels may be visualized as separate stages of one overall vertical channel.

Extract may be drawn off from intermediate points in the channel at different concentrations. Thus it is possible to obtain several different extract concentration streams if so desired. Also, if a particular concentration stream is found to contain a desired flavor fraction, the process of this invention can be used specifically to obtain that desired fraction of extract.

The process of this invention will be further described by reference to the following examples:

EXAMPLE I

A thermal gravitational column was constructed with concentric tubes with the following dimensions: height 68 inches, inner tube 1 inch O.D., middle tube 1.055 inches I.D., thus forming a channel or annulus of 0.0275 inch for extract flow, and a third tube forming an outer jacket around the two inner tubes. A feed tube was provided which passed through the outer tube wall and fed extract into the annular extract channel.

Coffee extract having a solids concentration of 26% was fed into the annular channel until the channel was filled. Hot water at 167° F. was passed through the inner tube and cold water at 76° F. was passed through the outer jacket. Water in both the inner and outer areas was fed in through the bottom and flowed out through the top. The discharge temperature of the hot water was 165° F. and the cold water discharge temperature was 78° F. Extract was drawn off from the top and bottom of the annular channel on a semi-continuous basis. The bottom product had a solids concentration of 35% and the product drawn off at the top had a solids concentration of 19%.

EXAMPLE II

The apparatus and procedure of Example I was repeated using an extract feed with a solids concentration of 9%. The bottom product had a solids concentration of 12.5% and the top product had a solids concentration of 6.0%.

The forgoing examples were for illustrative purposes only. The concentrations in the dilute and concentrated streams which may be achieved by the process of this invention are limited only by the physical characteristics of the equipment used, the temperature gradient imposed and the time allowed for separation. In the forgoing examples equilibrium conditions were achieved in about 60 minutes which compares favorably to the time necessary in other concentration processes for starting up and reaching equilibrium conditions.

While the concentration of the dilute extract stream can be reduced significantly below the 6% obtained in Example II, it may be more desirable to recover the solids in the dilute extract stream via some other technique, such as evaporative concentration or recirculation of the dilute stream through the percolator system.

The concentrated extract stream produced via the process of this invention was found to have a desirable flavor essentially equivalent to the flavor of the feed extract.

The process of this invention is further defined and is intended to be limited only by the appended claims.

What is claimed is:

1. A method of concentrating coffee extract comprising the steps of:
   (a) obtaining coffee extract having a solid concentration of from 15% to 30% from a commercial coffee percolation system;
   (b) feeding said extract into a vertical channel;
   (c) imposing a temperature differential across the channel, the width of said channel being from 0.01 to 0.1 inch, the temperature differential being imposed by contacting the outer side of the walls forming said channel with controlled temperature fluids, the fluid contacting one wall being at least 50° F. warmer than the fluid contacting the opposite wall, the temperature of the warmer fluid not exceeding about 200° F. to avoid heat damage to said extract, the temperature of the cooler fluid being greater than about 32° F. to avoid freezing water out of said extract;
   (d) drawing extract off from the bottom of said channel having a higher solids concentration than the feed extract; and
   (e) drawing extract off from the top of said channel having a lower solids concentration than the feed extract.

2. The method of claim 1 wherein the temperature of the warmer fluid is less than 180° F.

3. The method of claim 2 wherein the controlled temperature fluids are water.

4. The method of claim 3 wherein the high solids concentration extract is frozen and freeze dried.

References Cited

UNITED STATES PATENTS

| | | | |
|---|---|---|---|
| 2,541,070 | 2/1951 | Jones et al. | 210—72 |
| 2,767,850 | 10/1956 | Marsh | 210—72 |
| 2,772,782 | 12/1956 | Jansma | 210—72 |
| 2,791,332 | 5/1957 | Henke et al. | 210—72 |
| 3,422,008 | 1/1969 | McLain | 99—71 UX |

FRANK W. LUTTER, Primary Examiner

W. L. MENTLIK, Assistant Examiner

U.S. Cl. X.R.

210—72